US009349237B2

(12) United States Patent
Tian et al.

(10) Patent No.: US 9,349,237 B2
(45) **Date of Patent: *May 24, 2016**

(54) METHOD OF AUTHENTICATING A PRINTED DOCUMENT

(71) Applicants: Yibin Tian, Menlo Park, CA (US); Wei Ming, Cupertino, CA (US)

(72) Inventors: Yibin Tian, Menlo Park, CA (US); Wei Ming, Cupertino, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 785 days.

This patent is subject to a terminal disclaimer.

(21) Appl. No.: 13/730,743

(22) Filed: Dec. 28, 2012

(65) Prior Publication Data

US 2014/0183854 A1 Jul. 3, 2014

(51) Int. Cl.

| | |
|---|---|
| ***G06K 9/00*** | (2006.01) |
| ***G07D 7/20*** | (2016.01) |
| ***G07D 7/00*** | (2016.01) |
| *H04N 1/40* | (2006.01) |

(52) U.S. Cl.

CPC ................ *G07D 7/2058* (2013.01); *G07D 7/00* (2013.01)

(58) Field of Classification Search

USPC ......... 382/100, 103, 106, 112–116, 135–140, 382/155, 162, 168, 173–181, 199, 209, 219, 382/232, 254, 274, 276, 291, 305, 312, 382/233; 358/3.01; 235/375, 494; 726/2

See application file for complete search history.

(56) References Cited

U.S. PATENT DOCUMENTS

| | | | | |
|---|---|---|---|---|
| 8,000,528 B2 * | 8/2011 | Ming | ................. G06K 9/00463 382/112 |
| 2006/0157574 A1 * | 7/2006 | Farrar | ................... G06F 21/608 235/494 |
| 2009/0328143 A1 * | 12/2009 | Ming | .................... G06T 1/0028 726/2 |
| 2011/0121066 A1 * | 5/2011 | Tian | ........................ G06K 19/14 235/375 |
| 2011/0127321 A1 * | 6/2011 | Butler | ....................... G06K 5/02 235/375 |
| 2013/0050765 A1 * | 2/2013 | Zhan | .................... H04N 1/4446 358/3.01 |

OTHER PUBLICATIONS

Belongie et al., "Shape Matching and Object Recognition Using Shape Contexts", IEEE Transactions on Pattern Analysis and Machine Intelligence, vol. 24, No. 24, pp. 509-522, Apr. 2002.

(Continued)

*Primary Examiner* — Seyed Azarian

(74) *Attorney, Agent, or Firm* — Chen Yoshimura LLP

(57) ABSTRACT

A method for authenticating a printed document which carries barcode that encode authentication data, including word bounding boxes for each word in the original document image and data for reconstructing the original image. The printed document is scanned to generate a target document image, which is then segmented into text words. The word bounding boxes of the original and target document images are used to align the target document image. Then, each word in the original document image is compared to corresponding words in the target document image using word difference map and Hausdorff distance between them. Symbols of the original document image are further compared to corresponding symbols in the target document image using feature comparison, symbol difference map and Hausdorff distance comparison, and point matching. These various comparison results can identify alterations in the target document with respect to the original document, which can be visualized.

14 Claims, 2 Drawing Sheets

(56) References Cited

OTHER PUBLICATIONS

Chui et al., "A new point matching algorithm for non-rigid registration", Computer Vision and Image Understanding, 89, 2003, pp. 114-141.

Zheng et al., "Robust Point Matching for Nonrigid Shapes by Preserving Local Neighborhood Structures", IEEE Transactions on Pattern Analysis and Machine Intelligence, vol. 28, No. 4, pp. 643-649, Apr. 2006.

"JBIG2", Wikipedia, http://en.wikipedia.org/wiki/Jbig2, 5 pages, printed from the Internet on Dec. 2, 2012.

* cited by examiner

METHOD OF AUTHENTICATING A PRINTED DOCUMENT

BACKGROUND OF THE INVENTION

1. Field of the Invention

This invention relates to a method of document authentication, and in particular, it relates to a method of processing a self-authenticating document which carries barcode encoding authentication data to detect alterations in the document.

2. Description of Related Art

Original digital documents, which may include text, graphics, pictures, etc., are often printed, and the printed hard copy are distributed, copied, etc., and then often scanned back into digital form. Authenticating a scanned digital document refers to determining whether the scanned document is an authentic copy of the original digital document, i.e., whether the document has been altered while it was in the hard copy form. Alteration may occur due to deliberate effort or accidental events. Authentication of a document in a closed-loop process refers to generating a printed document that carries authentication data on the document itself, and authenticating the scanned-back document using the authentication data extracted from the scanned document. Such a printed document is said to be self-authenticating because no information other than what is on the printed document is required to authenticate its content.

Methods have been proposed to generate self-authenticating documents using barcode, in particular, two-dimensional (2d) barcode. Specifically, such methods include processing the content of the document (text, graphics, pictures, etc.) and converting it into authentication data which is a representation of the document content, encoding the authentication data in a 2d barcode (the authentication barcode), and printing the barcode on the same recording medium as the original document content. This results in a self-authenticating document. To authenticate such a printed document, the document is scanned to obtain a scanned image. The authentication barcode is also scanned and the authentication data contained therein is extracted. The scanned image is then processed and compared to the authentication data to determine if any content of the printed document has been altered, i.e. whether the document is authentic. Some authentication technologies are able to determine what is altered, and/or where is altered, some merely determine whether any alterations have occurred.

SUMMARY

The present invention is directed to a method of authenticating a document which carries barcode (including all forms of machine readable patterns or representation) containing authentication data, by decoding the barcode and comparing the decoded authentication data with the scanned document.

An object of the present invention is to provide an efficient method of comparing two document images for purpose of document authentication, in particular, as applied to documents containing text.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for authenticating a printed document, the printed document carrying barcode which encodes compressed image data representing a binary original document image, the method including: (a) obtaining an image representing the printed document; (b) separating the image into a target document image and the barcode; (c) decoding the barcode and decompressing the compressed image data therein to obtain the original document image; (d) binarizing the target document image; (e) aligning the target document image with respect to the original document image; (f) comparing each word in the original document image with a corresponding word in the target document image to detect any differences, comprising: (f1) for each word of the original document image obtained in step (c), finding the corresponding word of the target document image; (f2) generating a difference map and calculating a Hausdorff distance between each word of the original and the corresponding word of the target document image, and comparing the difference map and the Hausdorff distance to determine whether the corresponding words of the original and target document images are different; (f3) if the words of the original and target document images are not determined to be different in step (f2), identifying one or more candidate symbols in the word of the original document image and corresponding candidate symbols in the target document image; (f4) comparing image features of each candidate symbol of the original document image identified in step (f3) with image features of the corresponding candidate symbol of the target document image to determine whether any of the corresponding candidate symbols of the original and the target document images are different; (f5) if the corresponding symbols of the original and target document images are not determined to be different in step (f4), generating a difference map and calculating a Hausdorff distance between each candidate symbol of the original document image and the corresponding candidate symbol of the target document image, and comparing the difference map and the Hausdorff distance to determine whether any of the corresponding candidate symbols of the original and target document images are different; and (f6) if the corresponding symbols of the original and target document images are not determined to be different in step (f5), comparing shapes of each candidate symbol of the original document image and the corresponding candidate symbol of the target document image using a point matching method to determine whether any of the corresponding candidate symbols of the original and target document images are different; and (g) visualizing the differences detected in step (f).

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

The methods described here can be implemented in a data processing system which includes a processor, memory and a storage device. The data processing system may be a standalone computer connected to printers, scanners, copiers and/or multi-function devices, or it may be contained in a printer, a scanner, a copier or a multi-function device. The data processing system carries out the method by the processor executing computer programs stored in the storage device. In one aspect, the invention is a method carried out by a data processing system. In another aspect, the invention is computer program product embodied in computer usable non-transitory medium (storage device) having a computer readable program code embedded therein for controlling a data processing apparatus. In another aspect, the invention is embodied in a data processing system.

Figure 1A:
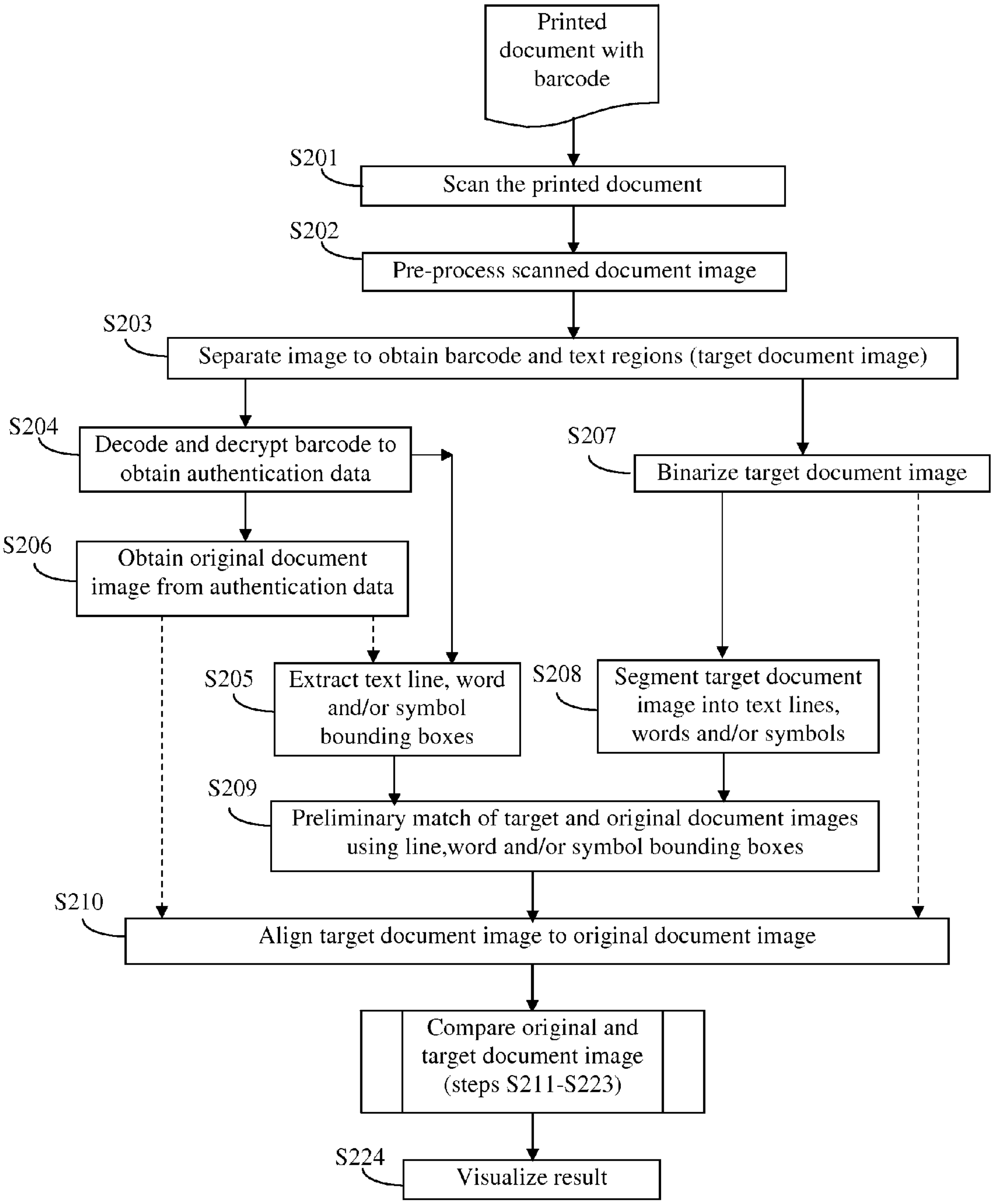
FIGS. 1A and 1B schematically illustrate a method of authenticating a document that carries authenticating information encoded in barcode according to an embodiment of the present invention.
Figure 1B:
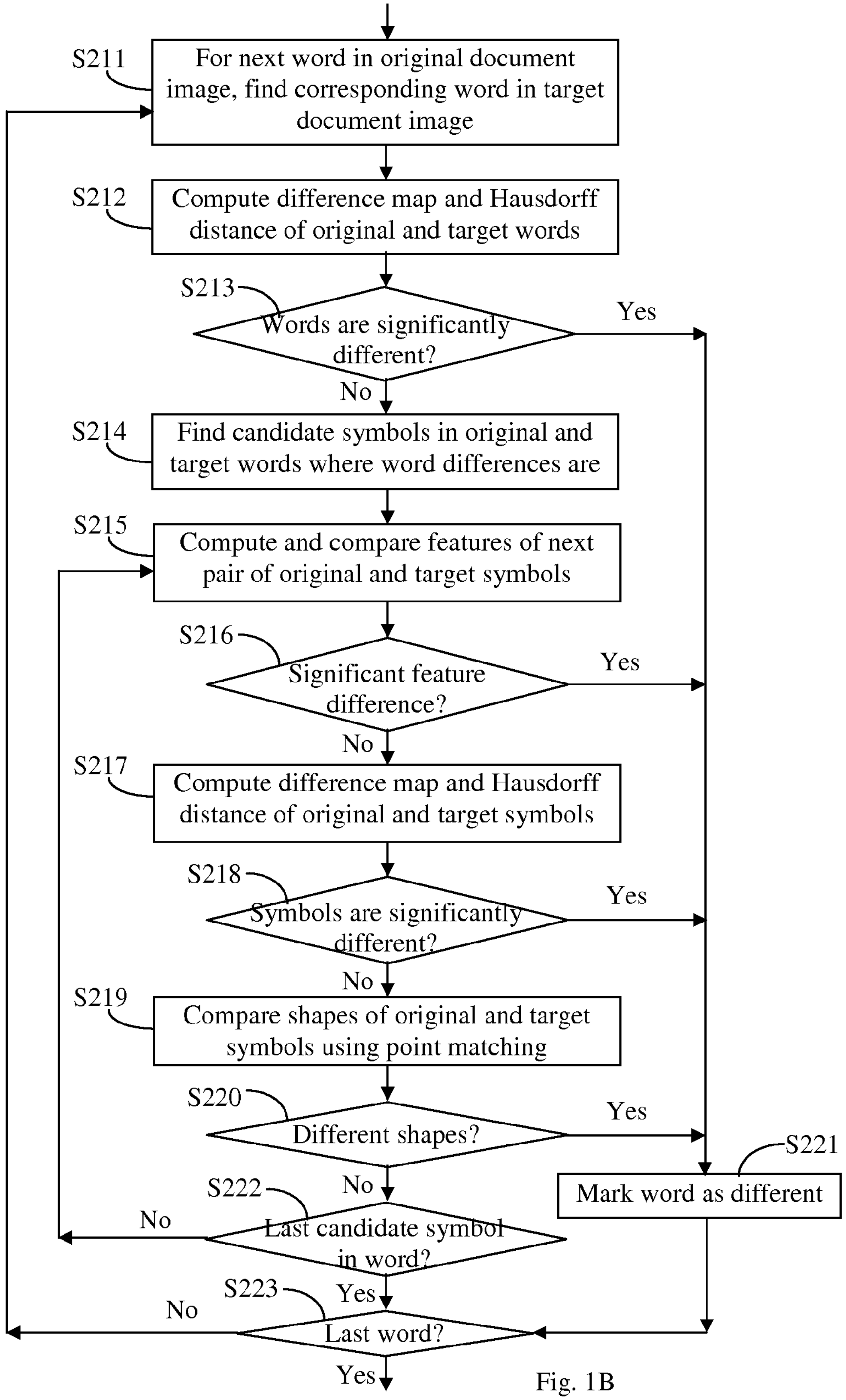

FIGS. 1A and 1B schematically illustrate a process of authenticating a printed document which carries barcode containing authentication data. Here, the term "barcode" broadly refers to any machine readable printed patterns or representation, includes one dimensional and two-dimensional barcodes, color barcode, etc. The authentication data includes compressed image data which can be decompressed to generate an original document image. The original document image is compared to the target document image generated by scanning the printed document to determine the authenticity of the printed document. The compressed image data may be generated using any suitable image compression method, such as JPEG, JBIG2, etc. In particular, JBIG2 is an efficient method for compressing images of documents that contain substantial amounts of text.

In addition to compressed image data, the authentication data may include (optionally) alignment information that can be used to align the target document image with the original document image before comparison. In one embodiment, the alignment information include locations and sizes of bounding boxes for text lines, words and/or symbols (e.g. letters, numerals, other symbols, etc.) in the original document image. The bounding boxes may be generated by segmenting the text in the original document image using suitable segmentation methods. In some image compression methods, bounding boxes are generated as a part of image compression.

In the authentication process shown in FIGS. 1A and 1B, the printed document is scanned, or photographed or otherwise imaged to generate an electronic document image (step S201). The scanned image is pre-processed (step S202), including de-noising (i.e. removal of small, isolated black dots), de-skewing, and/or correction of perspective distortions if the image was generated by a camera. These processes are carried out based on the assumption that a text document should generally have a preferred orientation where the lines of text are generally horizontal or vertical, and a front perspective from infinity. Any suitable techniques may be used to implement these pre-processing steps. The barcode and the text regions in the scanned image are separated (step S203). Since the present method does not treat graphics and pictures (if any) in the document, the text region alone is referred to herein as the target document image for simplicity.

The barcode is decoded and the data is decrypted as necessary to obtain the authentication data contained therein (step S204). If alignment information including the bounding boxes (locations and sizes) of the text lines, words and/or symbols were a part of the authentication data, they are extracted (step S205). The compressed image data is decompressed to generate the original document image (step S206).

Meanwhile, the target document image obtained in step S203 is binarized (step S207). Any suitable text separation methods and binarization methods may be used. The target document image is segmented into text lines and then into words (step S208). It should be noted that in this disclosure, the terms "lines", "words" and "symbols" refer to images corresponding to lines, words or symbols, not their ASCII representation. Line segmentation may be done by, for example, analyzing the horizontal projection profile or connected components of the image of a text region, or other suitable methods. Word and symbol segmentation may be done by, for example, a morphological operation and connected component analysis, or other suitable methods. As the result of segmentation, bounding boxes for the text lines and words are generated. Each bounding box is defined by its location and size.

Then, the line and word bounding boxes of the target document image generated in step S208 and the line and word bounding boxes of the original document image obtained in step S205 are used to perform a preliminary match of the target document image and the original document image (step S209). In this step, all of the bounding boxes or a selected subset of bounding boxes for the two document images may be used. The bounding box locations (e.g. a corner of each box) alone may be used, or both the bounding box locations and sizes may be used in the match. The matching is preferably performed using a RANSAC (RANdom SAmple Consensus) method. If the line and word bounding boxes of the original and target document fail to match each other as indicated by a suitable measure, the entire target document may be considered to have been altered and the authentication process stops (not shown in FIG. 2A). Otherwise, the matching step S209 calculates a preliminary alignment of the target document image with the original document image including rotation, translation, and/or scaling of the target document.

As mentioned earlier, the line, word and/or symbol bounding boxes of the original document image are optionally stored in the barcode as a part of the authentication information, and extracted in step S205. If such information is not stored in the barcode, then the line, word and/or symbol bounding boxes of the original document image can be generated by segmenting the decompressed original document image, i.e. from the original document image obtained in step S206, as indicated in FIG. 1A by the dashed line from box S206 to box S205.

Then, from the preliminarily alignment, the target document is aligned to the original document image (including rotation, scaling and/or translation), this time using the entire target image obtained in step S207 and the entire original document image obtained in step S206 (step S210). Cross-correlation or other suitable methods can be used. In the process flow shown in FIG. 1A, the matching step S209 is a coarse alignment using less information from both images; the alignment step S210 uses full image details of both images. As an alternative, step S220 may be omitted and the result of step S209 may be used as the final alignment. As another alternative (less preferred), step S209 may be omitted, and image registration is done on the two images (original and target) directly using cross-correlation or other method in step S210, as indicated by the dashed lines from box S206 to box S210 and from box S207 to box S210.

The target document image (after the adjustment in step S210) and the original document image are compared to detect any alterations in a process shown in steps S211 to S223. The comparison uses a progressive approach, first comparing at a word level and then comparing at a symbol level. In the flow described below, the words of the original document image are processed one by one and compared to the target document image. Alternatively, the comparison can be based on the target document, i.e., words in the target document image are processed one by one and compared to the original document image.

For the next word in the original document image (original word), the process finds a corresponding word in the target document image (target word) (step S211). This is done by a local matching process, i.e., an area of the target document image, which has the same location as but preferably a slightly larger size than the word bounding box in the original document image, is searched to find the target word image that matches the original word image. A difference map and a Hausdorff distance are computed for the original and target word (step S212). In this step, optionally, edge pixels of the original and target word images may be removed from the difference map to improve quality of the comparison. The difference map and the Hausdorff distance are evaluated to determine whether there is a significant difference between the original word and the target word (step S213). For example, if the number of different pixels in the difference map exceeds a threshold value (which may be set as a percentage of the total number of pixels in the original or target word, e.g., 20%), and/or if the Hausdorff distance exceeds another threshold value (which may be set as a percentage of the average of the maximum height and width of the original or target word, e.g. 10%), the two words may be deemed significantly different.

If the original and target words are deemed significantly different by such an evaluation ("Yes" in step S213), the target word is marked as being different from the original (step S221) and the process continues to the next word in the original document (step S223 and back to S211). If not ("No" in step S213), symbols in both the original document image (original symbols) and the target document (target symbols) are obtained at locations where the word difference map shows a significant difference (e.g., where the difference bits form a sufficiently large connected component) (step S214). These symbols are referred to as candidate symbols. Symbols located at places where the difference map shows substantially no difference are not deemed candidate symbols in step S214.

The step of finding candidate symbols (step S214) may be performed as follows. First, all connected components of the difference image are identified by a connected component analysis. For each connected component in the difference image, a distance is calculated between the connected component and each symbol in the original and target words, and the symbol in the original word and target word, respectively, that has the shortest distance to the connected component is chosen as a candidate symbols for this connected component of the difference image. The distance between the connected component and any symbol (which is also a connected component) may be defined as the shortest distance possible between any two pixels on the two respective connected components, or defined as the distance between the centroids of the respective connected components. All connected components of the difference image are processed to find all candidate symbols. It should be noted that sometimes, two or more connected components may correspond to the same candidate symbols. Thus, if all symbols in a word have been identified as candidate symbols, any remaining connected components in the difference map will not need to be processed.

The candidate symbols are examined through a series of steps to determine whether the original symbol and the corresponding target symbol are different. More specifically, for each pair of candidate symbols (original symbol and corresponding target symbol), the features of the symbols are computed and compared (step S215). The features used here may include zoning profiles, side profiles, topology statistics, low-order image moments, etc.

A zoning profile is generated by dividing the pixel block of a symbol (for example, a 100×100 pixel block) into a number of zones, such as m×n zones (m zones vertically and n zones horizontally). The average densities of the zones form an m×n matrix referred to as the zoning profile.

A side profile of a symbol is the profile of the symbol viewed from one side of its bounding box, such as left, right, top and bottom. The side profiles may be normalized (e.g. to between 0 and 1) for purpose of comparison; normalization is done by dividing the raw side profiles by the height of the symbol (for left and right profiles) or the width of the symbol (for top and bottom profiles). Side profiles may also be put into smaller number of bins than the number of pixel of the height or width of the symbol.

The topology statistics of a symbol may include, for example, the number of holes, the number of branch points, the number of end points, etc. in the symbol. A branch point of a symbol is the point on the symbol skeleton where at least three of its neighbors are also on the skeleton. An end of a symbol is the point on the symbol skeleton where one and only one of its neighbors is also on the skeleton. For example, the symbol "6" has one hole, one branching point and one end point; the symbol "a" has one hole, two branching points and two end points, etc.

Generic image moments are defined as:

$$M(p, q) = \sum_{y=1}^{H} \sum_{x=1}^{W} f(x^p, y^q) I(x, y)$$

where $f(x^p, y^q)$ is a function of $x^p$ and $y^q$, Hand W are the height and width of the image, and I(x,y) the image pixel value at (x, y). Depending on the specific format of $f(x^p, y^q)$, there are a number of moments described in the literature, such as geometrical moments, Zernike moments, Chebyshev moments, Krawtchouk moments and so on. Low-order moments are moments whose orders (as represented by (p+q)) are low. Low-order moments are less sensitive to minor image distortions compared to higher-order moments. These moments are preferably normalized.

These image features may be used to compare the original and target symbols in a number of ways. In one example, if the number of image feature that are different between the original and target symbols exceed a certain threshold, the two symbols are deemed different. In another example, if the number of image features that are different between the original and target symbols exceed a respective threshold for any category of profiles (zoning profiles, side profiles, topology statistics, and low-order image moments are each considered a category), the two symbols are deemed different. Other comparison criteria may be used.

If the differences in the features are significant ("Yes" in step S216), the target word is marked as being different from the original (step S221) and the process continues to the next word in the original document (step S223 and back to S211). Otherwise ("No" in step S216), a difference map and a Hausdorff distance of the pair of original and target symbols are computed (step S217), and are used to determine whether there is a significant difference between the original symbol and the target symbol (step S218). Step S218 may use a similar method as step S213 but the threshold values used in step S218 may be different.

If the original and target symbols are deemed significantly different in this step ("Yes" in step S218), the target word is marked as being different from the original (step S221) and the process continues to the next word in the original document (step S223 and back to S211). Otherwise ("No" in step S218), a point matching step is performed to compare the shapes of the original symbol and target symbols (step S219). Various point matching methods have been described, such as a method based on shape-context, described in Belongie et al., Shape Matching and Object Recognition Using Shape Contexts, IEEE Transactions on Pattern Analysis and Machine Intelligence, Vol. 24, No. 24, pp. 509-522, April 2002; a method based on thin-plate spline described in Chui et al., A new point matching algorithm for non-rigid registration, Computer Vision and Image Understanding 89 (2003) 114-141, and a method based on local structures, described in Zheng et al., Robust Point Matching for Nonrigid Shapes by Preserving Local Neighborhood Structures, IEEE Transactions on Pattern Analysis and Machine Intelligence, Vol. 28, No. 4, pp. 643-649, April 2006. Any one of these or other suitable point matching algorithm may be used here. If the original and target symbols are found to have different shapes in the point matching step ("Yes" in step S220), the target word is marked as being different from the original (step S221) and the process continues to the next word in the original document (step S223 and back to S211). Otherwise ("No" in step S220), this symbol in the target document is considered the same as the original symbol and the process continues to examine the next candidate symbol (step S222 and back to S215). If all candidate symbols are processed and none of them is considered different from the corresponding original symbols in steps S216, S218 and S220, then the target word is considered to be the same as the original word. The next word is then processed ("No" in step S223 and back to S211). This process including step S211 to S223 is repeated until all words in the original document are processed. It can be seen that the process (steps S212 to S220) performs a progressive series of comparisons of the original and target words and original and target symbols; as soon as a comparison step reveals a difference, the entire word is marked as different. Not all candidate symbols in each word are examiner in this process. In an alternative embodiment, if step S213 does not cause the word to be marked as different, then steps S215 to S220 are performed for all candidate symbols, all symbols that are different are marked.

After the comparison process, the comparison result is visualized (step S224). The visualization may take any appropriate form, including a display on a display screen, a printed document, a stored image, etc. The words that are found to be different are indicated in the visualization by appropriate means such as highlights, underlines, different colors, etc.

In the authentication process shown in FIGS. 1A and 1B, steps S201 to S210 can be considered a preparatory stage, with the goal of preparing an original document image and a target document image, on which the comparison steps S211 to S233 are carried out. The various steps of the preparatory stage can be performed by alternative methods, and the invention is not limited to the specific steps of the preparatory stage.

For example, in the process shown in FIG. 1A, preliminary registration of the target and original document involves using line and word bounding boxes (steps S205, S208 and S209), but many alternatives are possible. In one alternative embodiment, the text line bounding boxes are not used in the authentication process; only word bounding boxes are used in the preliminary matching step S209. In another alternative embodiment, the preliminary matching can be done on selected symbol bounding boxes. The choice of methods will impact the amount of authentication information being stored in the barcode. As mentioned earlier, if line, word and symbol bounding boxes are generated in the compression process, such bounding box information can be conveniently included in the barcode and used for image registration during authentication. More generally, however, image registration (steps S205, S208, S209 and S210) can be performed by any suitable method.

It should be noted that in the processes shown in the figures, the order of performing the various steps are not limited to that shown. Except when some steps depend on the processing results of other steps, or when as specifically stated, the various steps may be performed in any sequence or in parallel. For example, in FIG. 1A, steps S204 and S205 may be performed before, after or concurrently with steps S207 and S208. As another example (less preferred), the flow in FIG. 1B may be changed so that the word level comparison steps S212 and S213 may be performed for all words in the original document before moving on to the symbol-level comparisons; likewise, at the symbol level, one comparison (e.g. steps S215 and S216) can be performed for all candidate symbols of a word or of the document before moving on to the next comparison (e.g. steps S217 and S218). Thus, the scope of the invention is not limited to the flow shown in the drawings.

An advantage of the document authentication method described in this disclosure is that it is more tolerant to noise and image distortion than some other methods. Such tolerance is important as the target image may be prone to various noises and distortions due to the printing, copying and/or scanning processes.

It will be apparent to those skilled in the art that various modification and variations can be made in the document authentication method and apparatus of the present invention without departing from the spirit or scope of the invention. Thus, it is intended that the present invention cover modifications and variations that come within the scope of the appended claims and their equivalents.

What is claimed is:

1. A method for authenticating a printed document, the printed document carrying barcode which encodes compressed image data representing a binary original document image, the method comprising:

(a) obtaining an image representing the printed document;

(b) separating the image into a target document image and the barcode;

(c) decoding the barcode and decompressing the compressed image data therein to obtain the original document image;

(d) binarizing the target document image;

(e) aligning the target document image with respect to the original document image;

(f) comparing each word in the original document image with a corresponding word in the target document image to detect any differences, comprising:

(f1) for each word of the original document image obtained in step (c), finding the corresponding word of the target document image;

(f2) generating a difference map and calculating a Hausdorff distance between each word of the original and the corresponding word of the target document image, and comparing the difference map and the Hausdorff distance to determine whether the corresponding words of the original and target document images are different;

(f3) if the words of the original and target document images are not determined to be different in step (f2), identifying one or more candidate symbols in the word of the original document image and corresponding candidate symbols in the target document image;

(f4) comparing image features of each candidate symbol of the original document image identified in step (f3) with image features of the corresponding candidate symbol of the target document image to determine whether any of the corresponding candidate symbols of the original and the target document images are different;

(f5) if the corresponding symbols of the original and target document images are not determined to be different in step (f4), generating a difference map and calculating a Hausdorff distance between each candidate symbol of the original document image and the corresponding candidate symbol of the target document image, and comparing the difference map and the Hausdorff distance to determine whether any of the corresponding candidate symbols of the original and target document images are different; and (f6) if the corresponding symbols of the original and target document images are not determined to be different in step (f5), comparing shapes of each candidate symbol of the original document image and the corresponding candidate symbol of the target document image using a point matching method to determine whether any of the corresponding candidate symbols of the original and target document images are different; and (g) visualizing the differences detected in step (f).

2. The method of claim 1, wherein the barcode further encodes a plurality of original word bounding boxes each corresponding to a word in the original document, wherein step (c) further includes obtaining the plurality of original word bounding boxes from the barcode, and wherein step (e) comprises:

(e1) segmenting the target document image into words to obtain target word bounding boxes corresponding to words in the target document image;

(e2) matching at least some of the plurality of original word bounding boxes obtained in step (c) and at least some of the target word bounding boxes obtained in step (e1) to align the target document mage;

(e3) based on the alignment obtained in step (e2), further aligning the target document image using the target document image and the original document image.

3. The method of claim 2, wherein the barcode further encodes a plurality of original text line bounding boxes each corresponding to a line of text in the original document image, wherein step (c) further includes obtaining the plurality of original text line bounding boxes from the barcode, and wherein step (e1) further includes segmenting the target document image into lines of text to obtain target text line bounding boxes corresponding to lines of text in the target document image, and wherein step (e2) further includes matching at least some of the plurality of original text line bounding boxes obtained in step (c) and at least some of the target text line bounding boxes obtained in step (e1) to align the target document image.

4. The method of claim 2, wherein the step (f2) uses a RANSAC (RANdom SAmple Consensus) method.

5. The method of claim 1, wherein step (a) comprises scanning the printed document to generate a scanned image and pre-processing the scanned image including de-noising, de-skewing, and/or correction of perspective distortions.

6. The method of claim 1, wherein in step (f4), the image features include zoning profiles, side profiles, topology statistics, and low-order image moments.

7. The method of claim 1, wherein step (g) includes displaying or printing the original or target document image with indications that indicate any words of the original document image or the corresponding words of the target document image that are determined to be different in step (f2) and any candidate symbols of the original document image or the corresponding candidate symbols of the target document image that are determined to be different in steps (f4), (f5) and (f6).

8. A computer program product comprising a computer usable non-transitory medium having a computer readable program code embedded therein for controlling a data processing apparatus, the computer readable program code configured to cause the data processing apparatus to execute a process for authenticating a printed document, the printed document carrying barcode which encodes compressed image data representing a binary original document image, the process comprising:

(a) obtaining an image representing the printed document;

(b) separating the image into a target document image and the barcode;

(c) decoding the barcode and decompressing the compressed image data therein to obtain the original document image;

(d) binarizing the target document image;

(e) aligning the target document image with respect to the original document image;

(f) comparing each word in the original document image with a corresponding word in the target document image to detect any differences, comprising:

(f1) for each word of the original document image obtained in step (c), finding the corresponding word of the target document image;

(f2) generating a difference map and calculating a Hausdorff distance between each word of the original and the corresponding word of the target document image, and comparing the difference map and the Hausdorff distance to determine whether the corresponding words of the original and target document images are different;

(f3) if the words of the original and target document images are not determined to be different in step (f2), identifying one or more candidate symbols in the word of the original document image and corresponding candidate symbols in the target document image;

(f4) comparing image features of each candidate symbol of the original document image identified in step (f3) with image features of the corresponding candidate symbol of the target document image to determine whether any of the corresponding candidate symbols of the original and the target document images are different;

(f5) if the corresponding symbols of the original and target document images are not determined to be different in step (f4), generating a difference map and calculating a Hausdorff distance between each candidate symbol of the original document image and the corresponding candidate symbol of the target document image, and comparing the difference map and the Hausdorff distance to determine whether any of the corresponding candidate symbols of the original and target document images are different; and (f6) if the corresponding symbols of the original and target document images are not determined to be different in step (f5), comparing shapes of each candidate symbol of the original document image and the corresponding candidate symbol of the target document image using a point matching method to determine whether any of the corresponding candidate symbols of the original and target document images are different; and (g) visualizing the differences detected in step (f).

9. The computer program product of claim 8, wherein the barcode further encodes a plurality of original word bounding boxes each corresponding to a word in the original document, wherein step (c) further includes obtaining the plurality of original word bounding boxes from the barcode, and wherein step (e) comprises:

(e1) segmenting the target document image into words to obtain target word bounding boxes corresponding to words in the target document image;

(e2) matching at least some of the plurality of original word bounding boxes obtained in step (c) and at least some of the target word bounding boxes obtained in step (e1) to align the target document mage;

(e3) based on the alignment obtained in step (e2), further aligning the target document image using the target document image and the original document image.

10. The computer program product of claim 9, wherein the barcode further encodes a plurality of original text line bounding boxes each corresponding to a line of text in the original document image, wherein step (c) further includes obtaining the plurality of original text line bounding boxes from the barcode, and wherein step (e1) further includes segmenting the target document image into lines of text to obtain target text line bounding boxes corresponding to lines of text in the target document image, and wherein step (e2) further includes matching at least some of the plurality of original text line bounding boxes obtained in step (c) and at least some of the target text line bounding boxes obtained in step (e1) to align the target document image.

11. The computer program product of claim 9, wherein the step (f2) uses a RANSAC (RANdom SAmple Consensus) method.

12. The computer program product of claim 8, wherein step (a) comprises scanning the printed document to generate a scanned image and pre-processing the scanned image including de-noising, de-skewing, and/or correction of perspective distortions.

13. The computer program product of claim 8, wherein in step (f4), the image features include zoning profiles, side profiles, topology statistics, and low-order image moments.

14. The computer program product of claim 8, wherein step (g) includes displaying or printing the original or target document image with indications that indicate any words of the original document image or the corresponding words of the target document image that are determined to be different in step (f2) and any candidate symbols of the original document image or the corresponding candidate symbols of the target document image that are determined to be different in steps (f4), (f5) and (f6).

* * * * *